No. 794,195. PATENTED JULY 11, 1905.
H. W. SPANG.
ELECTRIC CIRCUITS FOR RAILWAY SIGNALING.
APPLICATION FILED SEPT. 30, 1902.

WITNESSES:
INVENTOR.
H. W. Spang.
BY
Townsend & Decker
ATTORNEYS

No. 794,195. PATENTED JULY 11, 1905.
H. W. SPANG.
ELECTRIC CIRCUITS FOR RAILWAY SIGNALING.
APPLICATION FILED SEPT. 30, 1902.

WITNESSES:
INVENTOR
H. W. Spang.
BY
ATTORNEYS

No. 794,195.

Patented July 11, 1905.

UNITED STATES PATENT OFFICE.

HENRY W. SPANG, OF NEW YORK, N. Y., ASSIGNOR, BY MESNE ASSIGNMENTS, TO CHARLES H. KETCHAM, OF YONKERS, NEW YORK.

ELECTRIC CIRCUITS FOR RAILWAY SIGNALING.

SPECIFICATION forming part of Letters Patent No. 794,195, dated July 11, 1905.

Application filed September 30, 1902. Serial No. 125,372.

*To all whom it may concern:*

Be it known that I, HENRY W. SPANG, a citizen of the United States, and a resident of New York city, in the county of New York and State of New York, have invented certain new and useful Improvements in Electric Circuits for Railway Signaling, of which the following is a specification.

My invention relates particularly to that class of electric track-circuits in which a relay or electromagnet is energized and a safety-signal given to an engineer at a fixed point at a suitable distance ahead of or at the near end of a section of railway-track when the rails of such section of railway are not occupied by another locomotive or train, the said rails serving as the principal electric conductors between such magnet connected therewith at one end and a generator at the opposite end of such section.

My invention consists in the combination of a guard-circuit consisting of two lines of rails of a block-section or other suitable conductors, a controlling magnet or magnets, a sectional generator and two independent metallic and two ground circuits formed over connections with two metallic return-conductors and ground connections taken from said circuit at its opposite ends at points respectively between the sections of generator and between coils of the controlling magnet or magnets.

It further consists in the combination of a guard-circuit, a portion thereof being upon the rolling equipment and including a controlling magnet or magnets terminating in wheels of different trucks insulated from each other in the rolling equipment and a portion thereof being upon the permanent way, including two lines of rails of a block-section connected at one end with a sectional generator and at opposite end with insulated rails located ahead of said block-section and two independent metallic and two ground circuits formed over connections with two metallic return-conductors and ground connections taken from said circuit at its opposite ends at points respectively between the sections of generator and between the coils of the controlling magnet or magnets upon the rolling equipment.

It further consists in the combination of an electric track-circuit consisting of two lines of rails of a block-section connected with generator, resistances, four insulated rails or short track-sections, and a controlling magnet or magnets along the permanent way so arranged that normally said magnet or magnets are inoperative in a closed circuit; but when the resistances are short-circuited by the wheels and axles of a locomotive or car bridging the said insulated rails the magnet or magnets will be fully energized and a safety-signal given.

It further consists in a compound relay magnet or magnets upon the rolling equipment which control a signal-circuit or signal thereon, and in which the armature lever or levers is or are moved in one direction by an electromagnet or magnets which terminate in the wheels of the rolling equipment and insulated from each other, forming portion of a guard-circuit and which is energized in connection with a portion of a guard-circuit along the permanent way consisting of a generator connected to two insulated rails or short sections of rail, and said lever or levers is or are moved in the opposite direction by an electromagnet or magnets energized by a generator upon the rolling equipment.

It further consists in the combination, with a guard-circuit on the permanent way consisting of a controlling magnet or magnets, two lines of rails of a block-section, a sectional generator, two grounded conductors connected with said circuit at points between the sections of generator and between magnet-coils or magnets, of a track-circuit closer adapted to establish a shunt or branch around said magnet or magnets and a partial circuit on the rolling equipment containing a controlling magnet or magnets terminating in wheels adapted to include the magnet or magnets on locomotive in the shunt or branch and having connections between the coils of the latter-named magnet or magnets and the locomotive, so as to provide each of said coils or magnets with an independent metallic and ground circuit.

It further consists in the novel arrangements and combinations of devices and connecting-conductors, as herein shown and described, and specifically set forth in the claims.

In the accompanying drawings, Figure 1 is a diagram illustrating one form of my invention as applied to one track of a double-track system in which the train always moves in one direction, as indicated by the arrow, the second or return track not being illustrated herein. Figs. 2 and 3 are modifications thereof. Fig. 6 illustrates a modification of ground connection.

Similar reference characters are used to designate like parts in all the views.

Figures 1, 2:
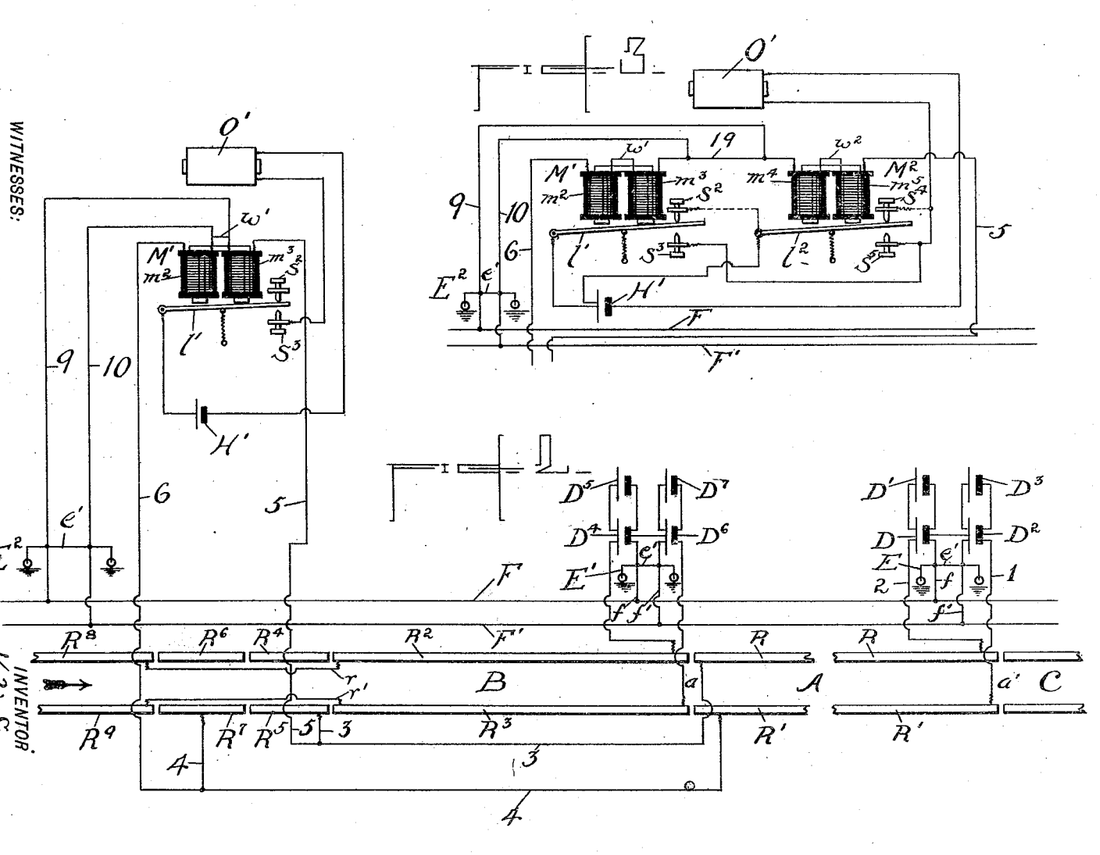

A is a section of track, which may be a mile long, more or less, and having its rails insulated or separated from metallic contact with the rails of the adjacent sections B and C, as shown at $a$ and $a'$. Rails R R' constitute section of track A, and rails $R^2$ $R^3$ $R^4$ $R^5$ $R^6$ $R^7$ $R^8$ $R^9$ constitute the adjacent section B. Each line of rails R R' of section A and $R^2$ $R^3$ $R^8$ $R^9$ of section B should have metallic continuity throughout its length by means of suitable metallic bonds or connectors at the rail-joints thereof. Rails $R^2$ $R^3$ $R^8$ $R^9$ of section B are connected together by metallic connectors $r$ and $r'$. Rails $R^4$ $R^5$ $R^6$ $R^7$ are insulated or separated from each other, and their insulations or separations are preferably directly opposite each other. Each of said rails can be a single rail or two or more bonded rails, according to the distance employed between wheels G and G' of the rolling equipment moving on said rails. Wheels G are insulated from G' in any suitable way. Preferably they are wheels belonging to different trucks of a tender or car on train of cars and are thus insulated from one another. Short sections $R^4$ $R^5$ $R^6$ $R^7$ consist of one or more insulated rails, and centers of rails $R^4$ $R^5$ are at such distance from centers of rails $R^6$ $R^7$ that when wheels G engage the rails $R^4$ $R^5$ wheels G' will engage $R^6$ $R^7$. When said rails are bridged by said wheels, they constitute a railway-track-circuit closer for momentarily completing or closing a circuit or circuits. In Fig. 1 the rails $R^4$, $R^5$, $R^6$, and $R^7$, in connection with wheels G G' and axles $g$ $g'$, constitute a circuit-closer for magnet M along the permanent way, and in Figs. 1 and 2 the rails $R^5$ and $R^7$, in connection with wheels G G', constitute a circuit-closer for the controlling magnet or magnets on locomotive. (Shown in Figs. 4 and 5.) Such insulated rails are preferably selected at a suitable point ahead of the near end $a$ of section of track A, so that when wheels G G' of locomotive and tender or of a car or cars moving in direction of arrow contact respectively with said rails and section of track A is clear a safety-signal will be given at a safe distance ahead of the near end thereof, either along the permanent way or upon a locomotive, or both.

D D' $D^2$ $D^3$ are gravity batteries or cells or other generators connected in series multiple or in any other suitable manner with the track-circuit and arranged in two sections, so that connections can be made between them and thereby constituting a sectional generator.

M, Fig. 1, M', Fig. 2, and M' $M^2$, Fig. 3, are relay-magnets of suitable type located along the permanent way and consisting of coils $m$ $m'$ $m^2$ $m^3$ and $m^4$ $m^5$, connected by wires $w$, $w'$, and $w^2$ and armature-levers $l$, $l'$, and $l^2$, which move in one direction, and contact, respectively, with stops S, $S^2$, and $S^4$ when said coils are energized, and in opposite direction by gravity or springs, or both, and contact with stops S', $S^3$, and $S^5$ when said coils are deënergized. Magnet M, Fig. 1, is located at a suitable point between end $a$ of section A and rails $R^4$ $R^5$ $R^6$ $R^7$ of section B and is in a normally closed circuit, but inoperative, and when fully energized lever $l$ contacts with stop S and closes circuit of signal-battery H over signal-magnet O, which can be employed in connection with suitable circuit-closing mechanism similar to that shown in application bearing Serial No. 120,447, filed August 21, 1902, by which a signal-circuit can be closed for a suitable period of time after magnet M has been momentarily energized and a safety-signal given for such period of time, the signal controlled by magnet O being normally at "danger" in an open circuit. Magnet M', Fig. 2, is in a constant circuit and when deënergized lever $l'$ contacts with stop $S^3$ and closes circuit of signal-battery H' over signal-magnet O' and causes a danger-signal to be given, the signal controlled by magnet O' being normally at "safety" in an open circuit.

K K', Fig. 1, are resistances, and their object is to render magnet M normally inoperative in a closed circuit. They will also serve as impedance or choke coils and will cause the induced electricity of rails R R' of section A during a thunder-storm to discharge over the adjacent ties, ballast, and earth, and specially over the ground connections E at end $a'$ of section A, simultaneously with lightning discharges taking place in line with adjacent or even remote points and not over magnet M along the permanent way. It is obvious that said resistances can be employed as solenoid or magnet coils for current-indicating purposes for either line of rails R R', or both. They can also be combined, as in one coil, but with each of the two coils in an independent leg of a circuit, and such coils can then jointly operate a single-current indicator or signal-controlling magnet.

E, E', and $E^2$ are ground connections or systems, each consisting, preferably, of a suitable number of iron pipes driven well into permanent moisture or otherwise well embedded in well-saturated earth and connected together by conductor or conductors $e'$. They should afford much better electrical continuity with the earth than that afforded by either of the lines of rails of section A or B in connection with the wooden ties, ballast, and adjacent surface earth, and especially during the moist condition thereof.

F F' are wires or other conductors of good conductivity extending along a track-circuit or any desired number of consecutive track-circuits and are connected by branch conductors $f\,f'$ with the sections of generators and with connecting-wires between controlling magnet-coils or magnets of such track-circuits and also with wires $e'$ and their ground connections, as shown in Figs. 1 and 2, or wires F F' can be connected directly with wires $e'$ and ground connections, as shown in Fig. 6. When the conductors F F' are solely employed as additional return metallic conductors, they can be insulated from the earth. They can also be utilized by the consecutive circuits of the second or return track of a double-track system, either as grounded return metallic conductors or solely as return metallic conductors. During a thunder-storm the induced electricity of the track-circuits of all or any number of consecutive block-sections will be able to discharge principally through the batteries at ends $a'$ to conductors F F', and thence to the earth via the multiplicity of ground connections simultaneously with lightning discharges taking place in line with railway or adjacent points, and thereby protect the controlling-relays from damage by such induced charges. The said grounded conductors can also be utilized in connection with lightning-arresters required for such track or guard circuits and other electrical circuits employed along the railway for the movement of trains or other purposes.

In Fig. 1 the batteries D D' $D^2$ $D^3$, in connection with resistances K K' and magnet M, are in a constant closed circuit with said magnet normally inoperative, and when a short circuit for said resistances is closed by wheels G G' and axles $g\,g'$ bridging rails $R^4$ $R^5$ $R^6$ $R^7$ and section A is clear magnet M will be fully energized and a safety-signal given by closing circuit of battery H over magnet O. The coils $m\,m'$ of magnet M will then not only be in a complete metallic circuit embracing both batteries D D' $D^2$ $D^3$ and both lines of rails R R' of section A, but each coil will be in an independent metallic and ground circuit, one independent metallic and ground circuit consisting of batteries D D', line of rails R, wire 3, insulated rail $R^5$, wheels G and axle $g$, rail $R^4$, wire 5, coil $m'$, wire 9, wire F, and ground connections E $E^2$, the other independent metallic and ground circuit consisting of wire 10, coil $m$, wire 6, rail $R^6$, wheels G' and axle $g'$, rail $R^7$, wire 4, line of rails R', wire 1, batteries $D^2$ $D^3$, wire F', and ground connections $E^2$ E.

By employing magnet M' along the permanent way, with wires F F' and ground connections E $E^2$ with rails of section A, as shown in Fig. 2, each coil $m^2$ and $m^3$ will be in an independent metallic circuit and ground-circuit embracing a line of rails, a grounded conductor, and a section of battery, and at the same time both coils will be in the usual metallic track-circuit consisting of both lines of rails R R' and all the battery-cells.

By substituting two relay-magnets M' $M^2$, controlling a signal-circuit and signal, in place of magnet M, Fig. 1, or M', Fig. 2, and connecting wires 9 and 10 with wire 19, connecting said magnets, as shown in Fig. 3, each magnet will be in an independent metallic and ground circuit in connection with a line of rails, two battery-cells, and a grounded conductor, while at the same time both magnets will be in the usual metallic circuit embracing both lines of rails R R' and all the battery-cells. Signal-magnet O' can only be energized by battery H' when both relays M' and $M^2$ are simultaneously energized in connection with the track-circuit of Fig. 1. When employed in connection with the track-circuit of Fig. 2, both relays will be normally energized and a danger-signal will be given when either relay is deënergized.

Magnet-coil $m'$, Fig. 1, coil $m^3$, Fig. 2, and magnet $M^2$, Fig. 3, in connection with battery-cells D D', can utilize not only ground connections E $E^2$, but any desired number of other ground connections connected with conductor F, especially as shown in Fig. 6, while coil $m$, Fig. 1, coil $m^2$, Fig. 2, and magnet M', Fig. 3, in connection with batteries $D^2$ $D^3$, can utilize any desired number of ground connections connected with conductor F'. Each controlling magnet-coil or magnet of a block-section is therefore energized in an ordinary metallic circuit embracing both lines of rails, also in an independent metallic circuit embracing one line of rails and conductor F or F' and in a ground-circuit with multiple ground connections. It is evident that with such circuits the resistance and retardation offered to the battery-current will be greatly reduced and the current-flow between the rails and the earth reduced to a minimum, and thereby enable the rails to be used for longer signal-circuits and better working circuits provided than is possible with the ordinary track-circuit. They will also positively cause a danger-signal to be given when a rail is removed or broken in a line of rails of a block-section.

Figures 4, 5:
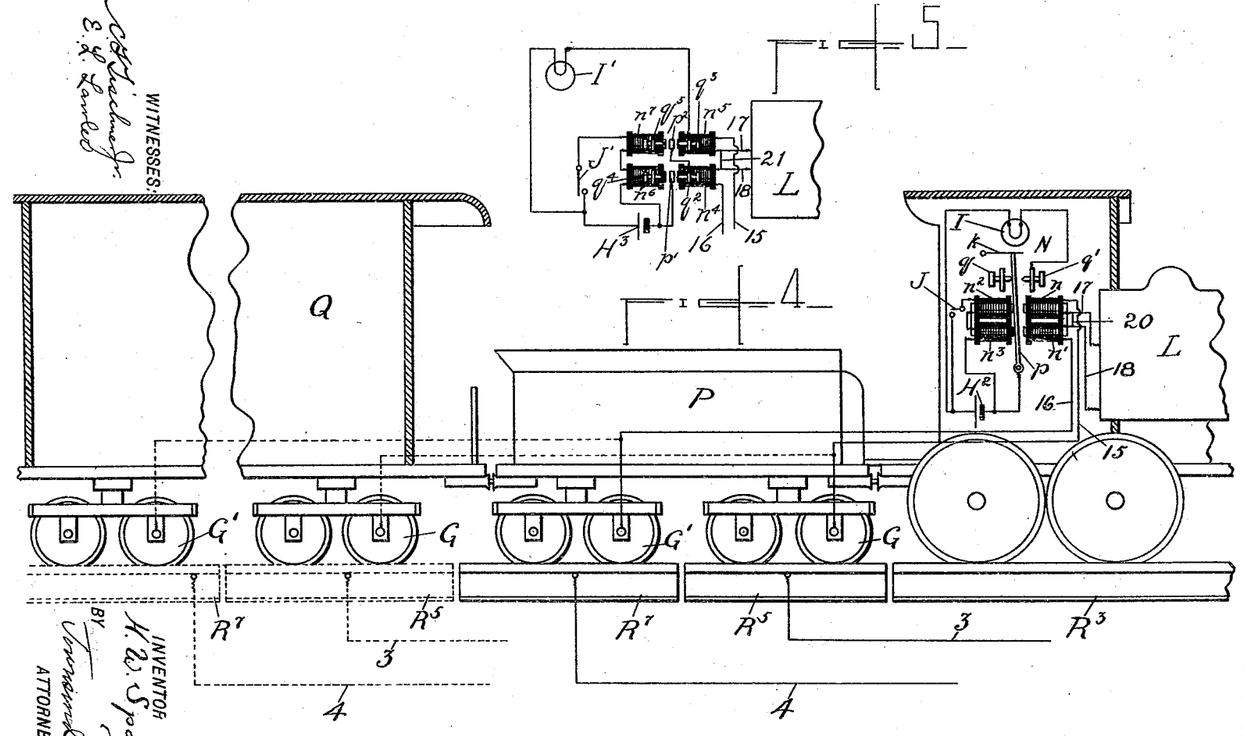
Fig. 4 is a side elevation of a locomotive and adjacent car, illustrating the portion of electric circuit thereon.
Fig. 5 illustrates two controlling-magnets therefor.

Compound magnet N, Fig. 4, upon a locomotive consists of lever $p$, moved in one direction by coils $n\,n'$ of an electromagnet and in the opposite direction by coils $n^2\,n^3$ of another electromagnet and successively contacting with stops $q$ $q'$. Coils $n$ $n'$ are connected by wires 15 16 with wheels G G' of front and rear trucks of tender P or adjacent car Q, and said wheels are insulated from each other. In order that each coil $n$ and $n'$ of said magnet may be operated in connection with wires F and F' and their ground connections (shown in Fig. 6) in an independent metallic and ground circuit, it is necessary to connect said coils $n$ $n'$ or the wire 20, connecting them, by wires 17 and 18 to the metal portion of the locomotive L or to any other suitable portion of the rolling equipment, and wires $f$ $f'$ must then be respectively connected with wires F F' at the points shown in Fig. 6 where wire $e'$ is connected with said wires, so as to form thereby connection with rails $R^2$ $R^3$, batteries $D^4$ $D^5$ $D^6$ $D^7$, and wires F F' and ground connections E', the current of said batteries being at the same time shunted from coils $n$ $n'$ upon locomotive and from magnet M, Fig. 1, M', Fig. 2, or magnets M' $M^2$, Fig. 3, along the permanent way by the wheels and axles of locomotive in connection with rails $R^2$ $R^3$ or $R^8$ $R^9$. Simultaneously with the energizing of magnet M along the permanent way in Fig. 1 the coils $n$ $n'$ of magnet N on locomotive will also be fully energized by current of batteries D D' $D^2$ $D^3$ flowing momentarily between rails $R^6$ $R^7$ and $R^4$ $R^5$ over wheels G G' and wires 15 and 16 in an ordinary metallic circuit, and each coil $n$ and $n'$ is also in an independent metallic and ground circuit by flowing over wires 17 and 18, locomotive L, rails $R^2$ $R^3$, and batteries $D^4$ $D^5$ $D^6$ $D^7$ of section B, ground connections E', wires F F', and ground connections E, thereby causing lever $p$ to contact with stop $q'$ and current of battery $H^2$ to flow over incandescent lamp I and giving a safety-signal on the locomotive until lever $p$ is attracted by coils $n^2$ $n^3$, energized by battery $H^2$ through circuit-closer J, operated by the engineer, or such circuit can be automatically closed by means of the heat of the signal-lamp I operating on a thermostat or by any other suitable means. The pressure-spring $k$, which rests upon the lever $p$, prevents it being moved by the jar of the locomotive from the position it is last placed and while said coils are deënergized. When wheels G G' and axles $g$ $g'$ bridge rails $R^4$ $R^5$ and $R^6$ $R^7$, Fig. 1, they will shunt resistances K K' and enable coils $m$ $m'$ of relay M, Fig. 1, and coils $n$ $n'$ of relay N, Fig. 3, to be energized, the coils $n$ $n'$ being then in a branch or shunt with coils $m$ $m'$. Coil $n$ when thus energized will be in an independent metallic and ground circuit embracing battery-cells D D', rails R, wire 3, rail $R^5$, wheels G, wire 15, wire 17, locomotive L, rails $R^3$, battery-cells $D^6$ $D^7$, wire $f'$, thence via wire $e'$, Fig. 6, to and over wire F to wire $f'$ at end $a'$ and also over ground connections E and E'. Coil $n'$ when thus energized will be in an independent metallic and ground circuit embracing batteries $D^4$ $D^5$, rails $R^2$, locomotive L, wire 18, wire 16, wheels G', rail $R^7$, wire 4, rails R', wire 1, battery-cells $D^2$ $D^3$, wire $f'$, to and over wire F' and wire $e'$, Fig. 6, at end $a$ to and over wire $f$ and also over ground connections E' and E. Should a safety-signal be seen along railway or upon locomotive before it reaches rails $R^4$ $R^5$ $R^6$ $R^7$, the engineer will know that lever $l$ of magnet M has stuck to stop S or lever $p$ of magnet N has stuck to stop $q'$, or that the signal mechanism is out of order. It is therefore obvious that under this system an engineer cannot be misled by an improper signal given by a defective relay-magnet or defective signal mechanism.

In Fig. 5 the signal-circuit embracing lamp I' and battery $H^3$ on locomotive is controlled by two levers $p'$ $p^2$ of two compound magnets which are moved in one direction between stops $q^2$ $q^4$ and $q^3$ $q^5$ by coils $n^4$ $n^5$, connected together by wire 21 and with portion of locomotive L by wires 17 and 18, and the said levers are moved in the opposite direction by battery $H^3$ and circuit-closer J'. The magnet $n^5$ when energized will be in the same metallic and ground circuit as coil $n$ in Fig. 4, and magnet $n^4$ will be in the same metallic and ground circuit as coil $n'$ of said figure, and both magnets $n^4$ $n^5$ will be in a branch or shunt with coils of relays M' $M^2$, Fig. 3. The wires 3 and 4 in Fig. 2 can also be respectively connected with rails $R^4$ $R^6$.

I do not confine myself to the operation of controlling magnet or magnets on the locomotive or other portion of the rolling equipment in multiple with controlling magnet or magnets on the permanent way, as it or they can be operated independently thereof in connection with the portion of guard-circuit on permanent way, consisting of insulated rails $R^4$ $R^5$ $R^6$ $R^7$ of section B, rails R R' of section A, sectional generators D D' $D^2$ $D^3$, and the grounded conductors F F', as herein described.

I do not confine myself to the employment of ordinary relays with neutral armatures with the guard-circuits herein shown and described, as polarized relays can be substituted and employed, and especially where two relays are required.

I do not confine myself to the employment of conductors F F', with or without the ground connections to the guard-circuits herein shown and described, as they are applicable to any suitable guard or metallic circuit or circuits.

I do not confine myself to the operation of each guard or track circuit by an independent sectional generator, as herein shown and described, as any number of such circuits can be charged by a single suitable sectional generator.

I do not confine myself to the circuit-closer, consisting of rails $R^4$ $R^5$ $R^6$ $R^7$, bridged by wheels G G', in connection with controlling magnet or magnets on the rolling equipment in connection with sectional generator and grounded conductors F F' on the permanent way, as two opposite insulated rails in connection with wheels G G' or any other suitable circuit-closer can be employed therewith.

It is obvious that each relay M' and M², Fig. 3, or magnet $n^5$ and $n^4$, Fig. 5, can operate an independent signal-circuit and signal instead of the same signal O' or I'.

I employ the term "guard-circuit" to indicate a primary or main circuit which embraces a relay or relays or electro magnet or magnets energized by the current of a generator included in a track or any other metallic circuit of a block-section which is under the control of a train or when included in a primary circuit having a circuit-controller operated by a railway-switch, drawbridge, or signalman, such relay or relays controlling a secondary or signal circuit or magnet or magnets directly controlling a signal along the permanent way or a signal or other device upon the rolling equipment.

What I claim as new, and desire to secure by Letters Patent, is—

1. The combination of a track-circuit formed of two lines of rails of a section of track having a suitable source of electricity connected to one end of the said rails, and a controlling-magnet with two coils connected to other end of said rails, of two conductors extending along said circuit and connected with ground connections and the said track-circuit at its opposite ends, so as to afford two additional metallic circuits one including one coil of said magnet, a line of rails and one of said conductors, the other circuit including the other coil of said magnet, a line of rails and the other of said conductors, and in addition thereto two independent ground-circuits formed over the two sides of track-circuit and the said ground connections, as and for the purpose set forth.

2. The combination of a track-circuit formed of two lines of rails of a section of track having a suitable source of electricity connected to one end of the said rails, and two controlling-magnets connected to other end of said rails, of two conductors extending along said circuit and connected with ground connections and the said track-circuit at its opposite ends, so as to afford two additional metallic circuits, one including a magnet, a line of rails and one of said conductors, the other circuit including the other magnet, a line of rails and the other of said conductors, and in addition thereto, two independent ground-circuits formed over the two sides of track-circuit and the said ground connections, as and for the purpose set forth.

3. In an electric railway signal system, the combination with a guard-circuit having a portion thereof upon the rolling equipment consisting of a controlling-magnet with two coils, terminating in wheels of different trucks, insulated from each other in the rolling equipment and the other portion of said circuit being upon the permanent way and consisting of the two lines of rails of a section of track having a sectional generator connected at one end thereof and insulated rails or sections of rail at the opposite end and adapted to complete said circuit when bridged by insulated wheels, of two conductors, extending along said circuit and connected with ground connections, and having connections taken at points between the sections of generator and connections between the said magnet-coils and the locomotive so as to afford connection with ground connections and said two conductors via the batteries and rails of the section of track upon which the locomotive is moving and thereby providing two additional metallic circuits, one circuit including a magnet-coil, a line of rails and one of said conductors, the other circuit including the other magnet-coil, a line of rails and the other of said conductors, and in addition thereto, two independent ground-circuits formed over the two sides of track-circuit and the said ground connections as and for the purpose set forth.

4. In an electric railway signal system, the combination with a guard-circuit having a portion thereof upon the rolling equipment consisting of two controlling-magnets terminating in wheels of different trucks insulated from each other, and the other portion of said circuit consisting of the two lines of rails of a section of track having a sectional generator connected at one end thereof and insulated rails or sections of rail at the opposite end and adapted to complete said circuit when bridged by said insulated wheels, of two conductors extending along said circuit and connected with ground connections, and having connections taken at points between the sections of generator and connections between the said magnets and the locomotive so as to afford connection with ground connections and said two conductors via the batteries and rails of the section of track upon which the locomotive is moving and thereby providing two additional metallic circuits, one circuit including a magnet, a line of rails and one of said conductors, the other circuit including the other magnet, a line of rails and the other of said conductors, and in addition thereto, two independent ground-circuits formed over the two sides of track-circuit and the said ground connections, as and for the purpose set forth.

5. The combination with a guard-circuit having a sectional generator and two controlling magnet-coils at opposite ends thereof, of two grounded conductors extending along the said circuit and connected therewith at points between said coils and sections of generator so as to afford two additional metallic circuits and two ground-circuits, each including a magnet-coil, one leg of the guard-circuit and one of the said grounded conductors.

6. The combination with a guard-circuit having a sectional generator and two controlling-magnets at opposite ends thereof, of two grounded conductors extending along the said circuit and connected therewith at points between said magnets and sections of generator so as to afford two additional metallic circuits and two ground-circuits, each including a magnet, one leg of the guard-circuit and one of the said grounded conductors.

7. The combination with a guard-circuit having two lines of rails of a block-section with a sectional generator and two controlling magnet-coils at opposite ends thereof, of two conductors extending along the said circuit and connected therewith at points between sections of generator and with ground connections, connections taken between said coils and the locomotive so as to afford connection with ground connections and said two conductors via the batteries and rails of the section of track upon which the locomotive is moving and thereby providing two additional metallic circuits and two ground-circuits, each including a magnet-coil, a line of rails and one of the said grounded conductors.

8. The combination with a guard-circuit having two lines of rails of a block-section with a sectional generator and two controlling-magnets at opposite ends thereof, of two conductors extending along the said circuit and connected therewith at points between sections of generator and with ground connections, connections taken between said magnets and the locomotive so as to afford connection with ground connections and said two conductors via the batteries and rails of the section of track upon which the locomotive is moving and thereby providing two additional metallic and two ground circuits each including a magnet, a line of rails and one of the said grounded conductors.

9. The combination with a guard or metallic circuit having a sectional generator and two controlling magnet-coils at opposite ends thereof, of two conductors extending along said circuit and connected therewith at points between said coils and sections of generator, so as to afford two additional metallic circuits, each including a magnet-coil, one leg of the guard-circuit and one of the said conductors.

10. The combination with a guard or metallic circuit having a sectional generator and two controlling-magnets at opposite ends thereof, of two conductors extending along said circuit and connected therewith at points between said magnets and sections of generator, so as to afford two additional metallic circuits each including a magnet, one leg of the guard-circuit and one of said conductors.

11. The combination with a guard or metallic circuit, formed of two sectional lines of rails, of a block-section having a sectional generator and two controlling magnet-coils at opposite ends thereof, of two conductors extending along the said circuit and connected therewith at points between said coils and sections of generator, so as to afford two additional metallic circuits, each including a magnet-coil, a line of rails and one of said conductors.

12. The combination with a guard or metallic circuit, formed of two sectional lines of rails, of a block-section, having a sectional generator and two controlling-magnets at opposite ends thereof, of two insulated conductors extending along the said circuit and connected therewith at points between said magnets and sections of generator, so as to afford two additional metallic circuits, each including a magnet, a line of rails and one of said conductors.

13. The combination with a guard-circuit formed of two controlling magnet-coils connected to two insulated rails or sections of rail, following one another, in one line of rails a sectional generator connected to two opposite rails or sections of rail, following one another, in the other line of rails and wheels and axles of different trucks of the rolling equipment, which when bridging the said four insulated rails complete the said guard-circuit, of two grounded conductors along the said circuit and connected therewith at points between said coils and sections of generator and also with ground connections so as to afford two additional metallic and two ground circuits, each including a magnet-coil, two opposite insulated rails, wheels and axles of one truck, a leg of the guard-circuit and one of said grounded conductors.

14. The combination with a guard-circuit formed of two controlling-magnets connected to two insulated rails or sections of rail following one another in one line of rails, a sectional generator connected to two opposite insulated rails or sections of rail following one another in the other line of rails, and wheels and axles of different trucks of the rolling equipment, which when bridging the said four insulated rails complete the said circuit, of two grounded conductors extending along the said circuit and connected therewith at points between said magnets and sections of generator and also with ground connections, so as to afford two additional metallic and two ground circuits, each including a magnet, two opposite insulated rails, wheels and axles of one truck, a leg of the guard-circuit and one of said grounded conductors.

15. The combination with a guard or metallic circuit formed of two controlling magnet-coils along the permanent way and connected to two insulated rails or sections of rail following one another in one line of rails, a block-section of railway-track, a sectional generator connected to the opposite lines of rails thereof at one end of said block-section and two opposite insulated rails or sections of rail following one another in the other line of rails connected to the said lines of rails at the opposite end of said block-section, and wheels and axles of different trucks of the rolling equipment, which when bridging the said four insulated rails complete the said guard-circuit, of two grounded conductors extending along the said circuit, and connected therewith at points between said coils and sections of generator and also with ground connections, so as to afford two additional metallic circuits, and two ground-circuits, each including a magnet-coil, two opposite insulated rails, wheels and axles of one truck, a sectional line of track-rails, and one of said grounded conductors.

16. The combination with a guard-circuit, formed of two controlling-magnets along the permanent way, and connected to two insulated rails or sections of rail following one another in one line of rails, a block-section of railway, a sectional generator connected to the opposite lines of rails of said block-section at one end thereof, two opposite insulated rails or sections of rail following one another in the other line of rails connected to the said lines of rails at the opposite end of said block-section and wheels and axles of different trucks of the rolling equipment which when bridging the said four insulated rails, complete the said guard-circuit, of two grounded conductors along the said circuit, and connected therewith at points between said magnets and said sections of generator and also with ground connections, so as to afford two additional metallic and two ground circuits each including a magnet, two opposite insulated rails, wheels and axles of one truck, a sectional line of track-rails and one of said grounded conductors.

17. The combination with a guard or metallic circuit formed of two controlling magnet-coils along the permanent way connected to two insulated rails or sections of rail following one another in one line of rails, a sectional generator connected to two opposite insulated rails or sections of rail following one another in the other line of rails, and wheels and axles of different trucks of the rolling equipment, which when bridging the said four insulated rails complete the said circuit, of two conductors extending along said guard-circuit and connected therewith at points between said coils and sections of generator, so as to afford two additional metallic circuits, each including a magnet-coil, two opposite insulated rails, wheels and axles of one truck, a leg of the guard-circuit and one of said conductors.

18. The combination with a guard or metallic circuit formed of two controlling-magnets along the permanent way, and connected to two insulated rails or sections of rail following one another in one line of rails, a sectional generator connected to two opposite insulated rails or sections of rail following one another in the other line of rails, and wheels and axles of different trucks of the rolling equipment, which when bridging the said four insulated rails complete said circuit, of two conductors along the said guard-circuit and connected therewith at points between said magnets and sections of generator, so as to afford two additional metallic circuits, each including a magnet, two opposite insulated rails, wheels and axles of one truck, a sectional line of rails and one of said conductors.

19. The combination with a guard-circuit having a controlling-magnet connected with said circuit at one end and normally inoperative, and a generator at the opposite end thereof, of resistances interposed in said circuit and four insulated rails or short sections of rails, over which said resistances are short-circuited when said rails are bridged by wheels and axles of different trucks of the rolling equipment and the magnet thereby energized and a signal given.

20. The combination with a guard or metallic circuit having two lines of rails of a block-section of track, with two controlling-magnets connected therewith at one end and normally inoperative and a generator at the opposite end thereof, of resistances interposed in said circuit and four insulated rails or short sections of rails over which said resistances are short-circuited when said rails are bridged by wheels and axles of different trucks of the rolling equipment and the two magnets thereby energized and a signal given.

21. The combination with a guard-circuit having two lines of rails of a block-section of track, with two controlling magnet-coils connected therewith at one end and normally inoperative, a sectional generator at the opposite end thereof, of two grounded conductors extending along the said circuit, connected at points between the sections of said generator and magnet-coils and also with ground connections, of resistances interposed in said circuit and four insulated rails or short sections of rails over which said resistances are short-circuited, when said rails are bridged by wheels and axles of different trucks of the rolling equipment and the magnet thereby energized by the ordinary guard-circuit and two additional metallic and ground circuits, each including a magnet-coil, a sectional line of track-rails, two insulated rails, wheels and axles of one truck, and one of said grounded conductors.

22. The combination with a guard-circuit, having two lines of rails of a block-section of track, with two controlling-magnets connected therewith at one end and normally inoperative, and a sectional generator at the opposite end thereof, of two grounded conductors extending along the said circuit, connected at points between the sections of said generator and magnets and also with ground connections, of resistances interposed in said circuit and four insulated rails or short sections of rails over which said resistances are short-circuited when said rails are bridged by wheels and axles of different trucks of the rolling equipment and the magnets thereby energized by the ordinary guard-circuit and two additional metallic and ground circuits, each including a magnet, a sectional line of track-rails, wheels and axles of one truck, and one of said grounded conductors.

23. The combination with a guard-circuit having a portion thereof upon the rolling equipment and including two controlling magnet-coils terminating in wheels of different trucks, insulated from each other in the rolling equipment and a portion thereof upon the permanent way, including two lines of rails of a track-section, connected at one end with a sectional generator and at opposite end with insulated rails located ahead of said track-section, of two independent metallic and two ground circuits formed over connections with two metallic return-conductors and ground connections at its opposite ends taken at points respectively between the sections of generator and between the magnet-coils upon the rolling equipment and the locomotive so as to form connection with ground connections via batteries and rails of the section of track upon which the locomotive is moving.

24. The combination with a guard-circuit having a portion thereof upon the rolling equipment and including two controlling-magnets terminating in wheels of different trucks insulated from each other in the rolling equipment and a portion thereof upon the permanent way, including two lines of rails of a track-section, connected at one end with a sectional generator and at opposite end with insulated rails located ahead of said track-section, of two independent metallic and two ground circuits formed over connections with two metallic return-conductors and ground connections at its opposite ends at points respectively between sections of generator and between the magnets upon the rolling equipment and the locomotive so as to form connection with ground connections via batteries and rails of the section of track upon which the locomotive is moving.

25. The combination with a guard-circuit having a portion thereof upon the rolling equipment including two controlling magnet-coils and terminating in wheels of different trucks, insulated from each other in the rolling equipment, and a portion thereof along the permanent way, including sectional lines of rails R, R', of block-section, A, which are connected at one end with a sectional generator and at the opposite end with insulated rails $R^5$, $R^7$, of adjacent section B, of two grounded conductors, F, F', extending along the railway and connected at points between the sections of generators connected with rails of sections A and B, and independent connection 17 and 18, between the said controlling magnet-coils and the locomotive or other portion of the rolling equipment so as to form connection with ground connections via batteries and rails of the section of track upon which the locomotive is moving, so that when said insulated rails $R^5$, $R^7$, are bridged by the said wheels G, G', both magnet-coils will be in a complete metallic circuit embracing the two lines of rails, R, R', of section A, and each coil will be in an additional metallic and ground circuit embracing a line of rails of section A, locomotive L, a portion of a line of rails of section B, and one of said grounded conductors.

26. The combination with a guard-circuit having a portion thereof upon the rolling equipment, including two controlling-magnets and terminating in wheels of different trucks, insulated from each other in the rolling equipment, and a portion thereof along the permanent way, including sectional lines of rails, R, R', of block-section, A, which are connected at one end with a sectional generator and at the opposite end with insulated rails $R^5$, $R^7$, of adjacent section B, of two grounded conductors, F, F', extending along the railway and connected at points between the sections of generators connected with rails of sections A and B, and independent connections 17 and 18, between the said controlling-magnets and the locomotive or other portion of the rolling equipment so as to form connection with ground connections via batteries and rails of the section of track upon which the locomotive is moving, so that when said insulated rails $R^5$, $R^7$, are bridged by said wheels G, G', both magnets will be in a complete metallic circuit embracing the two lines of rails R, R', of section A and each magnet will be in an additional metallic and ground circuit embracing a line of rails of section A, locomotive L, a portion of line of rails of section B and one of said grounded conductors.

27. The combination of two controlling magnet-coils on the rolling equipment, terminating in wheels of different trucks insulated from each other in the rolling equipment, independent connections taken from between said magnet-coils with another portion of the rolling equipment so as to form connection with two conductors extending along the railway via the batteries and rails of the section of track upon which said rolling equipment is moving, two lines of rails of a section of track having a sectional generator and said conductors connected thereto at one end and short sections of insulated rails connected thereto at the opposite end and adapted to form a circuit-closer in connection with the said insulated wheels, and arranged so that both said magnet-coils will be in a metallic circuit embracing two lines of rails of a section of track and each coil will be in an independent metallic circuit embracing a line of rails and one of said conductors.

28. The combination of two controlling-magnets on the rolling equipment, terminating in wheels of different trucks insulated from each other in the rolling equipment, independent connections taken from between said magnets with another portion of the rolling equipment, so as to form connection with the conductors extending along the railway via the batteries and rails of the section of track upon which said portion of the rolling equipment is moving two lines of rails of a section of track having a sectional generator and said conductors connected thereto at one end and short sections of insulated rails connected thereto at the opposite end and adapted to form a circuit-closer in connection with the said insulated wheels, and arranged so that both magnets will be in a metallic circuit embracing two lines of rails of a section of track and each magnet will be in an independent metallic circuit, embracing a line of rails and one of said conductors.

29. The combination with a controlling device on the rolling equipment of actuating-coils therefor, and terminating in wheels of the rolling equipment which are insulated from one another, four insulated rails or short sections of rails opposite each other in the two lines of rails of a railway-track a generator along the permanent way connected with two or all of said insulated rails or sections of rail, which when bridged by said wheels complete a guard-circuit for actuating the controlling device in one direction, of a generator, circuit-closer and actuating-coils upon the rolling equipment for actuating the said device in an opposite direction as set forth.

30. The combination with a controlling device on the rolling equipment of actuating-coils therefor, and terminating in the wheels of the rolling equipment, insulated from one another, four insulated rails or short sections of rails opposite each other in the two lines of rails of a railway-track a block-section of railway-track having its opposite lines of rails connected at one end to a generator and at the opposite end to two insulated rails or sections of rail, which when bridged by the said wheels will complete a guard-circuit for actuating the controlling device in one direction, of a generator, circuit-closer and actuating-coils upon the rolling equipment for actuating said device in an opposite direction as set forth.

31. The combination with a controlling device on the rolling equipment, of actuating-coils therefor, and terminating in the wheels of the rolling equipment, insulated from one another, a block-section A of railway-track having its opposite lines of rails connected at one end to a sectional generator and at the opposite end to insulated rails or sections of rail of adjacent section B, independent connections between the said actuating-coils and the locomotive or other portion of the rolling equipment so as to form connection with ground connections via batteries and rails of the section of track upon which the locomotive is moving, two grounded conductors extending along the railway and connected at points between the sections of generators of adjacent block-sections A and B, so that when said insulated rails are bridged by said insulated wheels the said actuating-coils will be energized by an ordinary guard or track circuit and each coil or coils will also be in an additional metallic and ground circuit embracing one line of rails of the guard-circuit and one of said grounded conductors, and thereby actuating said controlling device in one direction, of a generator, circuit-closer and actuating-coils upon the rolling equipment for actuating the said device in an opposite direction as set forth.

32. The combination with guard-circuits formed over sectional lines of rails of consecutive block-sections, each circuit having two lines of rails, a sectional generator connected therewith at one end and two controlling magnet-coils on the permanent way at the opposite end, of connections taken from points respectively between the sections of generator and between said magnet-coils with two grounded conductors extending along a railway, so as to form two additional metallic and two ground circuits, one for each magnet-coil.

33. The combination with guard-circuits formed over sectional lines of rails of consecutive block-sections, each circuit having two lines of rails, a sectional generator connected therewith at one end and two controlling-magnets on the permanent way at the opposite end, of connections taken at points respectively between the sections of generator and between the said magnets with two grounded conductors extending along a railway, so as to form two additional metallic and two ground circuits, one for each magnet.

34. The combination with guard-circuits formed over sectional lines of rails of consecutive block-sections, each circuit having two lines of rails, a sectional generator connected therewith at one end and insulated rails or sections of rail at the opposite end, two controlling magnet-coils on the rolling equipment and terminating in wheels G, G', of different trucks insulated from one another in the rolling equipment, of connections taken from points respectively between the sections of generator with two grounded conductors extending along railway and connections between said magnet-coils on the rolling equipment, with a portion of the rolling equipment, so as to form connection with said grounded conductors via batteries and rails of the section of track upon which said portion of the rolling equipment is moving so that when said insulated rails are bridged by said insulated wheels, a guard-circuit will be completed over the two magnet-coils and an additional metallic and ground circuit will be formed over each magnet-coil.

35. The combination with guard-circuits formed over sectional lines of rails of consecutive block-sections, each circuit having two lines of rails, a sectional generator connected therewith at one end and insulated rails or sections of rail at the opposite end, two controlling-magnets on the rolling equipment and terminating in wheels of different trucks insulated from one another in the rolling equipment, of connections taken from points respectively between the sections of generator with two grounded conductors extending along railway and between said magnets on the rolling equipment, with a portion of the rolling equipment, so as to form connection with said grounded conductors via batteries and rails of the section of track upon which said rolling equipment is moving, so that when said insulated rails are bridged by said insulated wheels, a guard-circuit will be completed over the two magnets, and an additional metallic and ground circuit will be formed over each magnet.

36. The combination with a railway-signal guard-circuit on the permanent way, consisting of two controlling magnet-coils or magnets, two lines of rails of a block-section, a sectional generator, two grounded conductors connected with said circuit at points between the sections of generator and between said magnet-coils or magnets, of a track-circuit closer adapted to establish a shunt or branch around said magnet-coils, or magnets and a partial circuit on the rolling equipment, containing two controlling magnet-coils terminating in wheels adapted to include the latter-named coils in the shunt or branch, and having connections between the said coils and the locomotive or other portion of the rolling equipment so as to form connection with said grounded conductors via batteries and rails of the section of track upon which the locomotive is moving, substantially as shown and described.

37. The combination with a railway-signal guard-circuit on the permanent way, consisting of two controlling magnet-coils or magnets, two lines of rails of a block-section, a sectional generator, two grounded conductors connected with said circuit at points between the sections of generator and between said magnet-coils or magnets, of a track-circuit closer adapted to establish a shunt or branch around said magnet-coils or magnets, and a partial circuit on the rolling equipment, containing two controlling-magnets terminating in wheels adapted to include the latter-named magnets in the shunt or branch, and having connections between the said magnets and the locomotive or other portion of the rolling equipment so as to form connection with said two grounded conductors via batteries and rails of the section of track upon which the locomotive is moving, substantially as shown and described.

38. The combination of a partial guard-circuit on the rolling equipment containing magnet-coils $n$, $n'$, of controlling-magnet N, and terminating in wheels G, G', of different trucks of the rolling equipment, with a guard-circuit along the permanent way consisting of rails R, R', of section A, connected at one end with a sectional generator, and at the other end with insulated rails $R^5$, $R^7$, $R^4$, $R^6$, of section B, resistances K, K', and two coils of controlling-magnet M, normally inoperative, and two grounded conductors F, F', connected with sectional generators of sections A and B and with points between the coils of magnet M, independent connections 17, 18, between the said magnet-coils, $n$, $n'$, and the locomotive L, so as to form connection with the said grounded conductors via the batteries and track-rails $R^2$ $R^3$ of section of track B so that when locomotive L bridges rails $R^2$, $R^3$, of section B, and insulated wheels G, G', and axles $g$, $g'$, bridge insulated rails $R^4$, $R^5$, $R^6$, $R^7$, said resistances will be shunted and both coils of magnets M and N will be energized in a guard-circuit and each coil of said magnets in an additional metallic and ground circuit as set forth.

39. The combination of a partial guard-circuit on the rolling equipment containing magnet-coils $n$, $n'$, of controlling-magnet, N, and terminating in wheels G, G', of different trucks of the rolling equipment, with a guard-circuit along the permanent way consisting of rails R, R', of section A, connected at one end with sectional generator, and at the other end with insulated rails $R^5$, $R^7$, of section B, and two coils of controlling-magnet M' normally energized, and two grounded conductors F, F', extending along the railway and connected with sectional generators of sections A and B, and with points between coils of magnet M' independent connections 17, 18, between the said magnet-coils, $n$, $n'$, and the locomotive, L, so as to form connection with the said grounded conductors via the batteries and track-rails $R^2$ $R^3$ of section of track B so that when locomotive L bridges rails $R^2$, $R^3$, of section B, and insulated wheels G, G', bridge insulated rails $R^5$, $R^7$, both coils of magnet N will also be energized in a guard-circuit, and each coil in an independent metallic and ground circuit.

40. The combination with the sectional generators respectively connected with the sectional lines of rails of consecutive block-sections, of connections taken at points between the sections of generators with two grounded conductors extending along a railway as and for the purpose set forth.

41. The combination with the sectional generators respectively connected with the sectional lines of rails of consecutive block-sections of connections taken at points between the sections of generators with two metallic return-conductors extending along a railway substantially as shown and described.

42. The combination, with the two lines of rails, R R' of a block-section, of a guard-circuit, consisting of a line R, of said rails, and an independent metallic return, F, having a generator D, D', at one end and a signal-controlling magnet $M^2$, at the opposite end, substantially as set forth.

43. The combination with the two lines of rails R R' of a block-section, of a guard-circuit, consisting of a line R, of said rails, and an independent grounded metallic return, F, having a generator D, D', at one end and a signal-controlling magnet, $M^2$, at the opposite end substantially as set forth.

44. The combination, with the two lines of rails R R' of a block-section, of a guard-circuit consisting of a line R of said rails and an independent metallic return, F, having at one end a generator, D D', and at the opposite end two opposite insulated rails, $R^4$, $R^5$, of preceding block-section, B, signal-controlling magnet, $n^5$, upon the locomotive, terminating by wire, 15, with insulated wheels, G, of the rolling equipment and by wire 17 with the locomotive, L, so as to form connection with the said metallic return by the battery and rails of the section of track, B, upon which the locomotive is moving, when said insulated rails are bridged by said insulated wheels as set forth.

45. The combination with the two lines of rails, R, R', of a block-section, of a guard-circuit consisting of a line, R, of said rails and an independent grounded metallic return, F, having at one end a generator D D' and at the opposite end, two opposite insulated rails, $R^4$, $R^5$, of preceding block-section, B, signal-controlling magnet, $n^5$, upon the locomotive, terminating, by wire, 15, with insulated wheels, G, and by wire, 17, with the locomotive, L, so as to form connection with said grounded metallic return by the battery and rails of the section of track, B, upon which the locomotive is moving, when said insulated rails are bridged by said insulated wheels as set forth.

Signed at New York city, in the county of New York and State of New York, this 29th day of September, A. D. 1902.

HENRY W. SPANG.

Witnesses:
J. GALLWITZ,
E. L. LAWLER.